(12) United States Patent
Hsu

(10) Patent No.: US 7,999,493 B2
(45) Date of Patent: Aug. 16, 2011

(54) PRIMARY-SIDE DRIVING CONTROL CIRCUIT FOR BACKLIGHT OF LCD PANEL

(75) Inventor: Ta-Ching Hsu, Sijhih (TW)

(73) Assignee: Niko Semiconductor Co., Ltd., Taipei (TW)

( * ) Notice: Subject to any disclaimer, the term of this patent is extended or adjusted under 35 U.S.C. 154(b) by 609 days.

(21) Appl. No.: 12/149,414

(22) Filed: May 1, 2008

(65) Prior Publication Data

US 2008/0309244 A1 Dec. 18, 2008

(30) Foreign Application Priority Data

Jun. 13, 2007 (TW) .............................. 96121387 A

(51) Int. Cl.
*H05B 41/36* (2006.01)
(52) U.S. Cl. ......... 315/307; 315/219; 315/308; 315/177
(58) Field of Classification Search .................. 315/137,
315/138, 139, 141, 144, 149, 152, 159, 177,
315/186, 193, 200 R, 201, 205, 206, 209 R,
315/210, 217, 219, 220, 224, 226, 246, 247,
315/250, 254, 255, 276, 277, 279, 282, 287,
315/291, 297, 299, 300, 301, 307, 308, 312,
315/313
See application file for complete search history.

(56) References Cited

U.S. PATENT DOCUMENTS

| | | | | |
|---|---|---|---|---|
| 4,322,817 | A | * | 3/1982 | Kuster ............................. 363/26 |
| 5,977,725 | A | * | 11/1999 | Miyazaki et al. ............. 315/291 |
| 2006/0284568 | A1 | * | 12/2006 | Chang et al. .................. 315/282 |

* cited by examiner

*Primary Examiner* — Douglas W Owens
*Assistant Examiner* — Jianzi Chen
(74) *Attorney, Agent, or Firm* — Rosenberg, Klein & Lee

(57) ABSTRACT

The present invention discloses a primary-side driving backlight circuit for LCD panel. The primary-side driving backlight circuit employs a single isolation device to achieve isolation request for safety for the secondary side. The PWM controller on the secondary-side of a transformer generates a control signal according to a feedback signal. The control signal is transmitted by the isolation device to a High/Low side driver. The High/Low side driver has a High Output and a Low Output, which drives power switches at high side and low side respectively, in order to control the power of an input source transmitting into the transformer and further control the voltage and current of cold cathode lamp(s) of a backlight circuit.

18 Claims, 10 Drawing Sheets

PRIMARY-SIDE DRIVING CONTROL CIRCUIT FOR BACKLIGHT OF LCD PANEL

BACKGROUND OF THE INVENTION

1. Field of the Invention

The present invention relates to a primary-side driving backlight circuit for a Liquid Crystal Display (LCD) panel, which employs a single isolation device, transferring the conducting pulse signal output by the Pulse Width Modulation (PWM) controller located on the secondary-side to the primary-side, to achieve the isolation request for safety for the secondary-side, and further employs the High/Low side driver, to drive the power switch element, so as to provide better circuit simplification and functions than conventional methods, which is particularly significant in terms of circuit simplification and functions for full-bridge based topology.

2. Description of Related Art

As illustrated in FIG. 1, a half-bridge based primary-side driving backlight power supply of prior art is shown. AC inputs L and N are rectified by a bridge rectifier BD1 and pass through a power factor correcting circuit (consisting of capacitor C10, transformer T1, transistor Q10, resistor R1, PFC controller 8, diode D10, capacitor C11), generating a stable DC input power source VIN to supply required energy for outputting. When the push-pull PWM controller 10 on the secondary-side starts to operate and the output terminals DRV1 and DRV2 of the push-pull PWM controller 10 begin to send out pulse width signals, the input terminals of the isolation driving transformer T3 is coupled to the output terminals DRV1 and DRV2 of the push-pull PWM controller 10 and one of the two output winding sets of the isolation driving transformer T3 has the same polarity with the input winding, while the other output winding has the opposite polarity. Therefore, the isolation driving transformer T3 generates positive and negative pulse driving signals, whereas the driving circuits 14a, 14b are respectively responsible for filtering the positive/negative pulse signals and outputting modulated positive/negative pulse signals, so as to avoid abnormal actions in the power switches Q11, Q12. When the output terminal DRV1 of the push-pull PWM controller 10 presents high level, the power switch Q11 is conducting, and when output terminal DRV1 becomes low, the power switch Q11 is cutoff. For the other output terminal DRV2 of the push-pull PWM controller 10, when it becomes high level, the power switch Q12 is conducting, and when output terminal DRV2 becomes low, the power switch Q12 accordingly is cutoff, which situation repeats again and again, keeping the entire system stable. During the dead time of half-bridge based output pulse, current continuously flows through the body diodes of the power switches Q11, Q12. Because the current flowing through the half-bridge based power switch is twice as much as the current in the full-bridge based one, the half-bridge based is less efficient than the full-bridge based, while the advantage of half-bridge based system is its simple circuit arrangement.

As illustrated in FIG. 2, a primary-side driving backlight power source supply of prior art is shown. The secondary-side circuit and actions are almost identical, and the output terminals DRV1 and DRV2 of the push-pull PWM controller are respectively coupled to the isolation driving transformers T3 and T4; the isolation driving transformers T3 and T4 are components of the exact same structure, which individually has a set of input winding, and two sets of output windings with the same polarity as the input winding. In the isolation driving transformers T3 and T4 shown in FIG. 2, each end of the input winding thereof is coupled to a different output of the push-pull PWM controller, such that the positive/negative pulse signals on the input winding of the isolation driving transformers T3 and T4 are exactly opposite, and the positive/negative pulse signals on the output winding of the isolation driving transformers T3 and T4 are also exactly opposite, but the output of the same isolation driving transformer is designed to have positive/negative pulse signal of the same polarity. In this way, the power switches Q11, Q14 are simultaneously controlled to be conductive, while the power switches Q12, Q13 are also simultaneously controlled to be conductive in another conducting time; meanwhile, the driving circuit 14a, 14b, 14c, 14d coupled to controlled ends of each power switches are responsible for filtering the positive/negative pulse signals, so as to avoid abnormal switch action. The dead time of the full-bridge based primary-side driving backlight power source supply of prior art shown in FIG. 2 and the dead time of the push-pull PWM controller 10 are identical, but in case that the conducting time is designed to be small, then the dead time will become larger. During the dead time, the current only flows through the body diode with larger voltage fall, thus causing higher power loss.

The prior art primary-side driving backlight power source supply, by using a transformer, converts the signals on the output terminals DRV1, DRV2 of the push-pull PWM controller, and transfers the converted signals to the driving circuits DRIVER1 (ie. 14a), DRIVER2 (ie. 14b) to achieve isolation request for safety. However, it takes more energy to drive a transformer, the driving energy requirement of signal on the output terminals DRV1 and DRV2 of the push-pull PWM controller is accordingly higher; therefore it is more demanding on the driving capability of the push-pull PWM controller; besides, the cost and size of the transformer are more significant, causing the increase of system cost.

SUMMARY OF THE INVENTION

In view of the aforementioned issues, the present invention provides a primary-side driving control circuit for backlight of Liquid Crystal Displayer (LCD) panel, which employs a single isolation device to transfer conducting pulse signal output by the Pulse Width Modulation (PWM) controller located on the secondary-side to the primary-side as the isolation request for safety for the secondary-side, and further employs the integrated High/Low side driver to drive the power switch element, so as to reduce the cost of power supply circuit, increase operational efficiency and simplify the layout on the Print Circuit Board (PCB).

To achieve the objectives described supra, the present invention provides a primary-side driving control circuit for backlight of LCD panel, which comprises a transformer, a power switch element, a PWM controller, an isolation device and a High/Low side driver.

The transformer has a primary-side and a secondary-side, converting the energy received on the primary-side to outputs on the secondary-side to drive a light source module. The power switch element is coupled to an input power source and the primary-side of the transformer, transmitting the power from the input power source to the primary-side of the transformer. The PWM controller has at least one feedback control terminal and an input signal control terminal, as well as at least one output terminal, wherein the PWM controller generates output signals on the at least one output terminal according to the signals received on the at least one feedback control terminal and the input signal control terminal. The isolation device has an input terminal and an output terminal, in which the input terminal receives the output signal from the PWM controller, and outputs an isolation signal on the output terminal. The High/Low side driver is coupled to the isolation device and the power switch element, controlling the power switch element to transmit the energy of the input power source to the primary-side of the transformer based on the isolation signal.

Accordingly, the present invention employs an isolation device to transfer conducting pulse signal output by the Pulse Width Modulation (PWM) controller located on the secondary-side to the primary-side to achieve the isolation request for safety for the secondary-side, and further employs the integrated High/Low side driver to drive the power switch element, so as to implements the advantages of power supply circuit cost reduction, operational efficiency enhancement and Print Circuit Board (PCB) layout simplification.

DETAILED DESCRIPTION OF THE PREFERRED EMBODIMENTS

Figure 3:
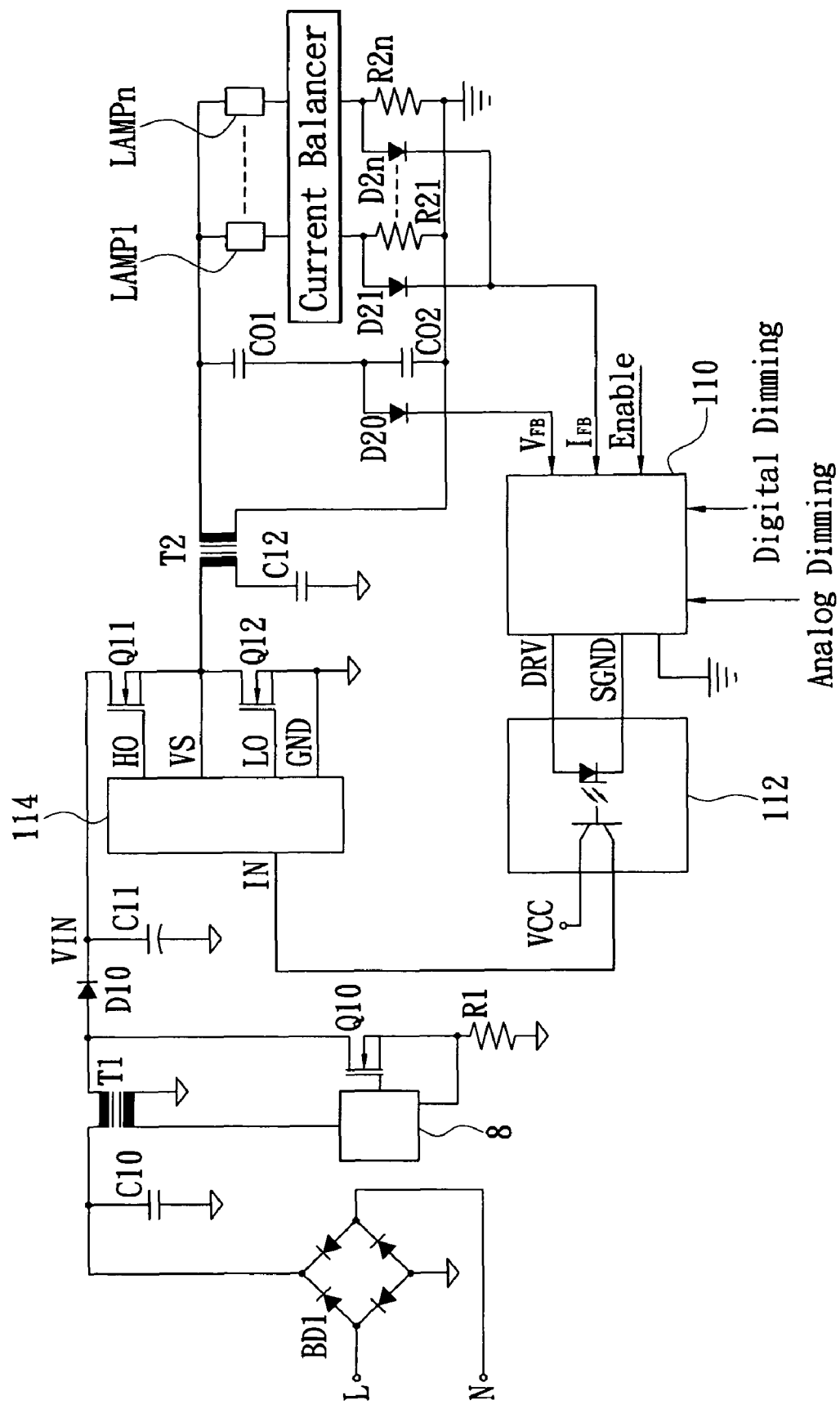
FIG. 3 is representative diagram of a primary-side driving control circuit for backlight of LCD panel according to the present invention.

FIG. 3 is representative diagram of a primary-side driving control circuit for backlight of LCD panel according to the present invention, which comprises a Pulse Width Modulation (PWM) controller 110, an isolation device 112, a High/Low side driver 114, power switches Q11 and Q12 as well as a transformer T2, for driving a light source module (composed by multiple cold cathode lamps LAMP1~LAMPn). In the present embodiment, the PWM controller 110 is located on the secondary-side, which has a current feedback input terminal, a voltage feedback input terminal, an analog dimming input terminal, a digital dimming input terminal and an enable control terminal, and these control terminals can manipulate the PWM controller to output corresponding output waveforms. When the supply of system's power is normal and the PWM controller 110 operates, the PWM controller 110 receives signals from the current feedback input terminal, the voltage feedback input terminal, the analog dimming input terminal, the digital dimming input terminal as well as the enable control terminal, and accordingly generates output signals on the output terminal DRV. For example, the signal from the enable control terminal may control the output terminal DRV of the PWM controller 110 to start or stop outputting pulse signals; the signals from the current feedback input terminal and the voltage feedback input terminal control the pulse width of the output signal coming from the PWM controller 110, in order to achieve the purpose of cold cathode lamp current and voltage stabilization; the signals from the analog dimming input terminal and the digital dimming input terminal modify the conducting time in different ways, so as to meet the demand for brightness adjustment. The PWM controller 110 shown in FIG. 3 outputs a continuous pulse signal to the input terminal of the isolation device 112, and the isolation device 112 accordingly outputs a continuous pulse signal to the input terminal of the High/Low side driver 114, then the High/Low side driver 114 performs phase splitting process on the continuous pulse signal received on the input terminal thereof, herein the odd pulse is transferred to the High output terminal to drive the power switch Q11 at the High side, while the even pulse is transferred to the Low output terminal to drive the power switch Q12 at the Low side, thus the pulse frequency on the High output terminal or Low output terminal of the High/Low side driver 114 is half of the one on its input terminal, and pulse on the High output terminal and Low output terminal present the same pulse width with 180° inversed phase; when the High side power switch Q11 is conducting (Low side power switch Q12 is cutoff at this moment), the energy from the DC input VIN of the transformer flows through the High side power switch Q11, the primary-side winding on the transformer T2, the capacitor C12 then to ground. When the Low side power switch Q12 is conducting (High side power switch Q11 is cutoff at this moment), the energy is released from capacitor C12 and flows through the primary-side winding on the transformer T2, power switch Q12 then to ground, thus repeating in cycle, allowing to keep the entire system stable. Certainly, the major function of the PWM controller 110 is to deliver the information concerning pulse width of stably output current to the High/Low side driver 114. In practice, the frequency of the High/Low side driver 114 may be independent of the frequency in the PWM controller 110, and the frequency relationship between them described in the aforementioned embodiment is merely exemplary, rather than limiting the scope of the present invention.

Figure 4:
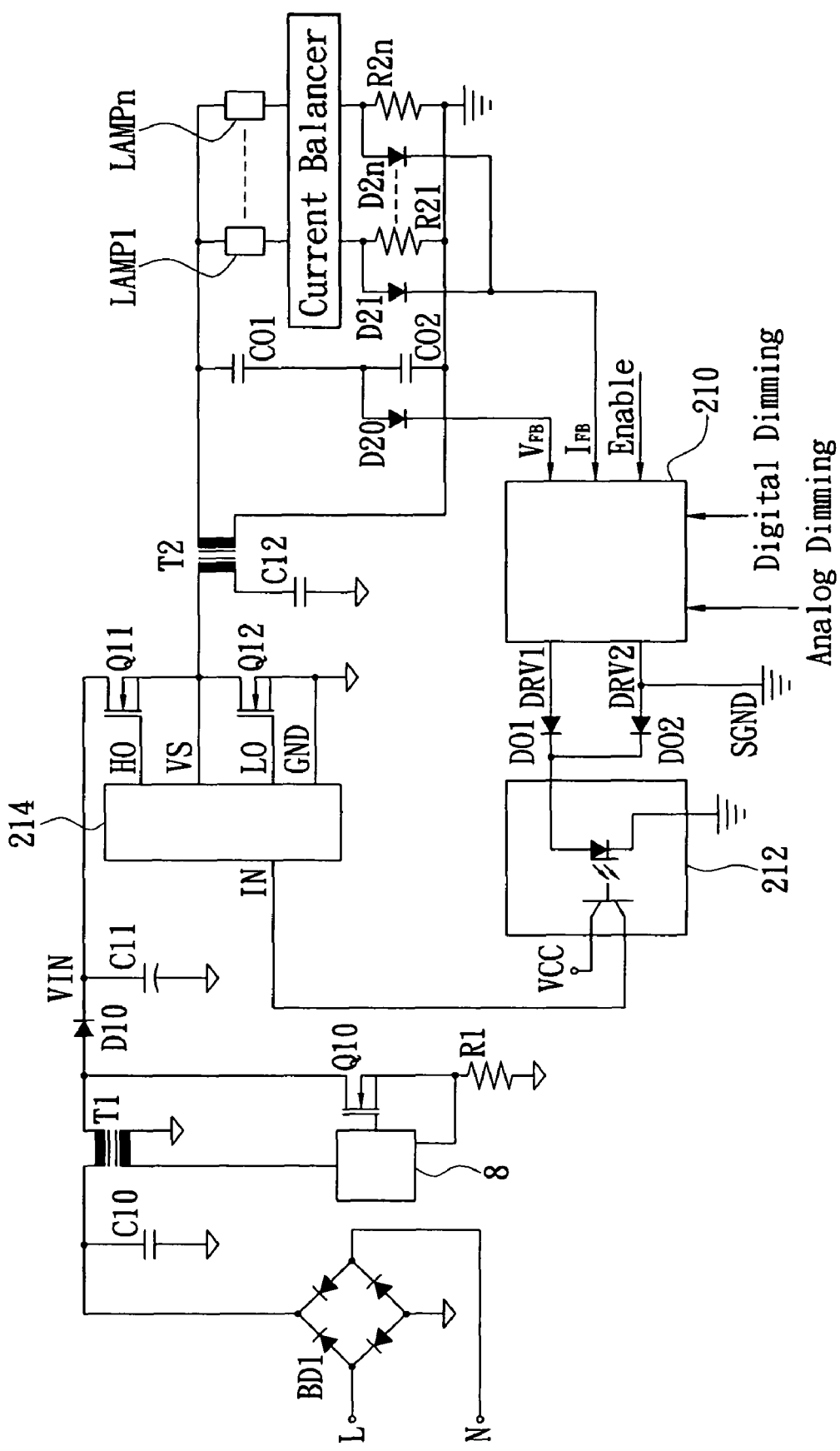
FIG. 4 is diagram of a first embodiment of the primary-side driving control circuit for backlight of LCD panel according to the present invention.

FIG. 4 is diagram of a first embodiment of the primary-side driving control circuit for backlight of LCD panel according to the present invention. As shown in FIG. 4, the switch configuration on the primary-side is half-bridge based topology, and the PWM controller 210 on the secondary-side is a push-pull dual-output controller. Each of the two outputs on the controller 210 is coupled with a fast diode D01, D02, and the N ends of the fast diodes D01, D02 are coupled together to generate a continuous pulse signal, in which the frequency of the continuous pulse signal is twice of the PWM controller 210. The continuous pulse signal is of the same type as the one found at the input of the isolation device 112 input from the PWN controller 110 shown in FIG. 3, and the types as well as actions of components on the primary-side are exactly identical as what is shown in FIG. 3; that is, the component 212 outputs a continuous pulse signal which is then input to the input terminal of the High/Low side driver 214, and the High/Low side driver 214 performs phase splitting process on the continuous pulse signal received on the input terminal, herein the odd pulse is transferred to the High output terminal to drive the power switch Q11 at the High side, while the even pulse is transferred to the Low output terminal to drive the power switch Q12 at the Low side, thus the pulse frequency on the High output or Low output of the High/Low side driver is half of the one on its input, and pulse on the High output terminal and Low output terminal present the same pulse width with 180° inversed phase; when the High side power switch Q11 is conducting, the energy from the DC input VIN of the transformer flows through the High side power switch Q11, the primary-side winding on the transformer T2, the capacitor C12 then to ground, and when the Low side power switch Q12 is conducting, the energy is released from capacitor C12 and flows through the primary-side winding on the transformer T2, power switch Q12 then to ground, thus repeating in cycle, keeping the entire system stable.

Figure 1:
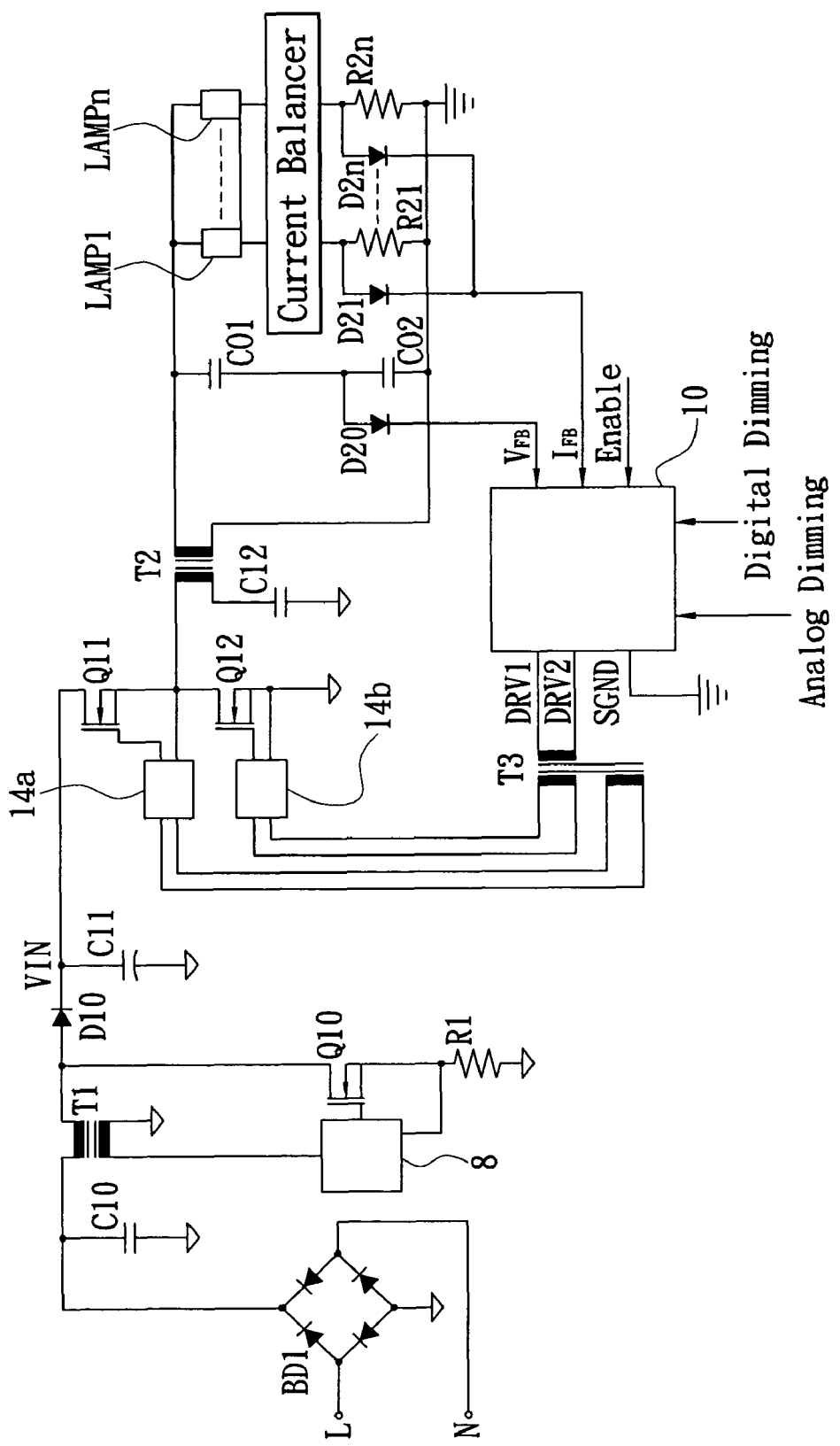
FIG. 1 is a diagram of a half-bridge based primary-side driving backlight power source supply of prior art.
Figure 2:
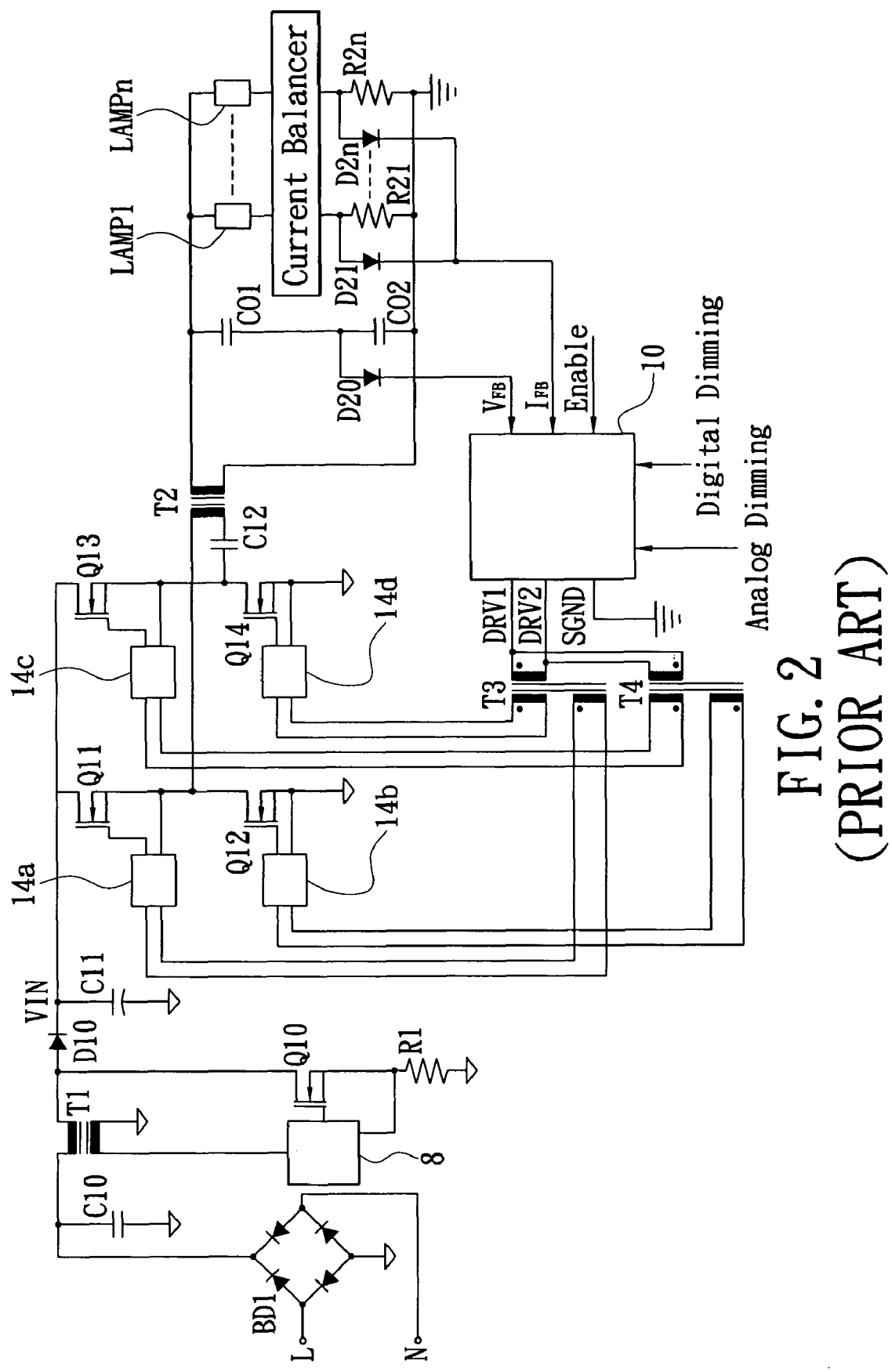
FIG. 2 is a diagram of a full-bridge based primary-side driving backlight power source supply of prior art.
Figure 5:
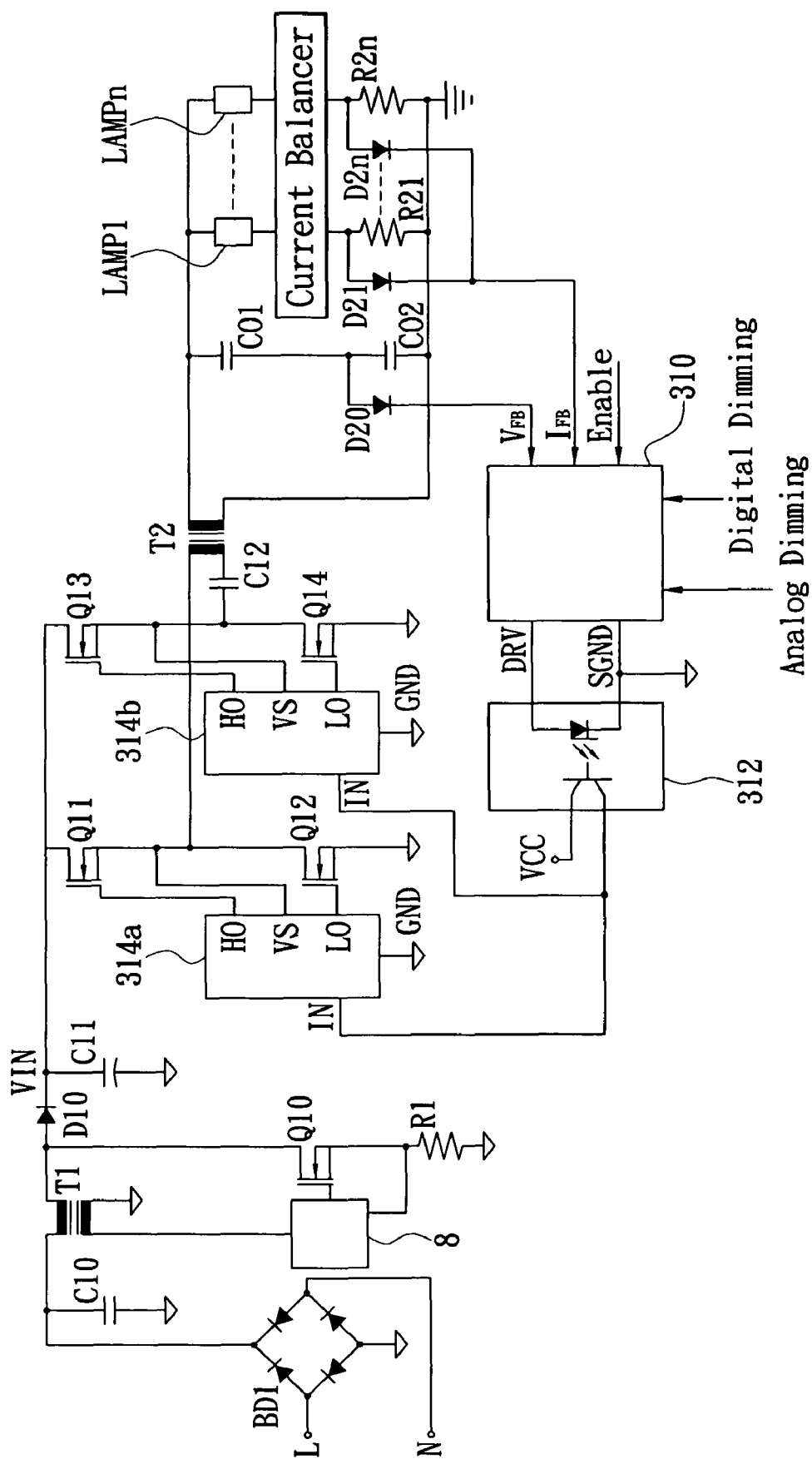
FIG. 5 is diagram of a second embodiment of the primary-side driving control circuit for backlight of LCD panel according to the present invention.

FIG. 5 is diagram of a second embodiment of the primary-side driving control circuit for backlight of LCD panel according to the present invention. As shown in FIG. 5, the switch configuration action on the primary-side is full-bridge based topology, which is different from the configuration action found in the prior art full-bridge based topology illustrated in FIG. 2. The configuration action of prior art full-bridge based topology illustrated in FIG. 2 are that the opposite pair conduct at the same time and close at the same, while the configuration action of the full-bridge based topology shown in FIG. 5 are that the odd pulse in a continuous pulse signal drives the power switch Q12 on left Low side, and the even pulse therein drives the power switch Q14 on right Low side, so as to control the conducting time of left and right Low side power switches Q12 and Q14. The conducting time of left and right High side power switches Q11 and Q13 is complementary to the Low side driving signal at the same side, and between the pulse of High and Low sides there is a very short non-overlapping time (dead time), which is provided to prevent the occurrence of short circuit in High and Low power switches located at the same side. This innovative full-bridge based topology switching configuration action has been widely adopted and applied to the secondary-side DC-to-AC backlight power source circuits, and, for being employed on the primary-side, it is necessary to conjunctively use the specific High/Low side driving units 314a and 314b described in the present invention to accomplish the required actions, and, in the full-bridge based topology. The said High/Low side driving units 314a and 314b further comprise a High/Low side driving unit 314a controlled by odd pulse, as well as a High/Low side driving unit 314b controlled by even pulse, which respectively drives left High/Low side power switches Q11, Q12 and right High/Low side power switches Q13, Q14. Since, for each power switch, there is only a very short non-overlapping time to allow the body diode in the power switch to act as a current path, so the power loss can be comparatively less, and efficiency can be significantly enhanced.

Figure 6:
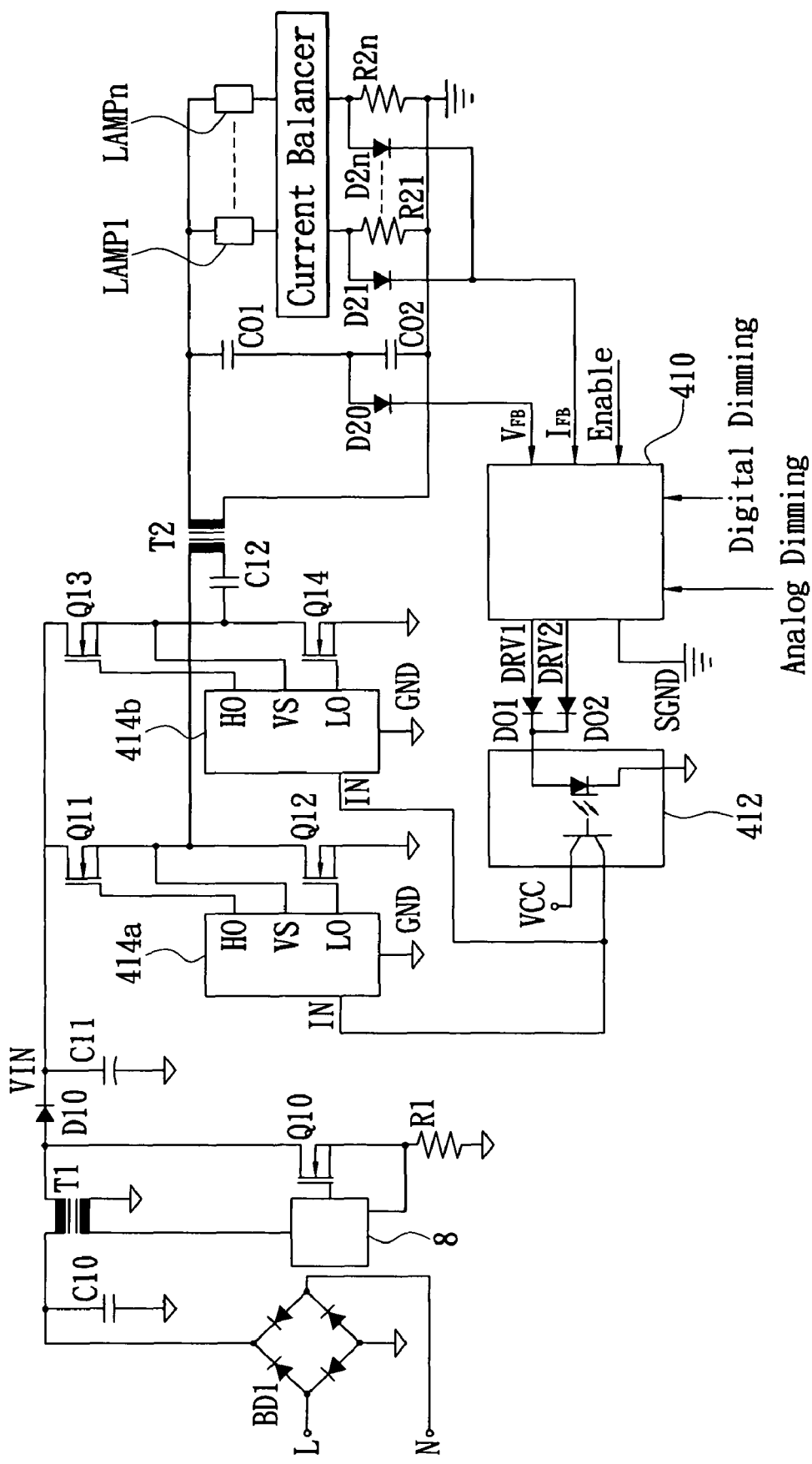
FIG. 6 is diagram of a third embodiment of the primary-side driving control circuit for backlight of LCD panel according to the present invention.

FIG. 6 is diagram of a third embodiment of the primary-side driving control circuit for backlight of LCD panel according to the present invention. As shown in FIG. 6, the PWM controller 310 illustrated in FIG. 5 is replaced by the push-pull dual-output controller 410, wherein each of the two outputs on the controller 410 is coupled to a fast diode D01, D02, and the N ends of the fast diodes D01, D02 are coupled together to generate a continuous pulse signal transferred via the isolation device 412, so as to achieve the same action pattern on the primary-side shown in FIG. 5.

Figure 7:
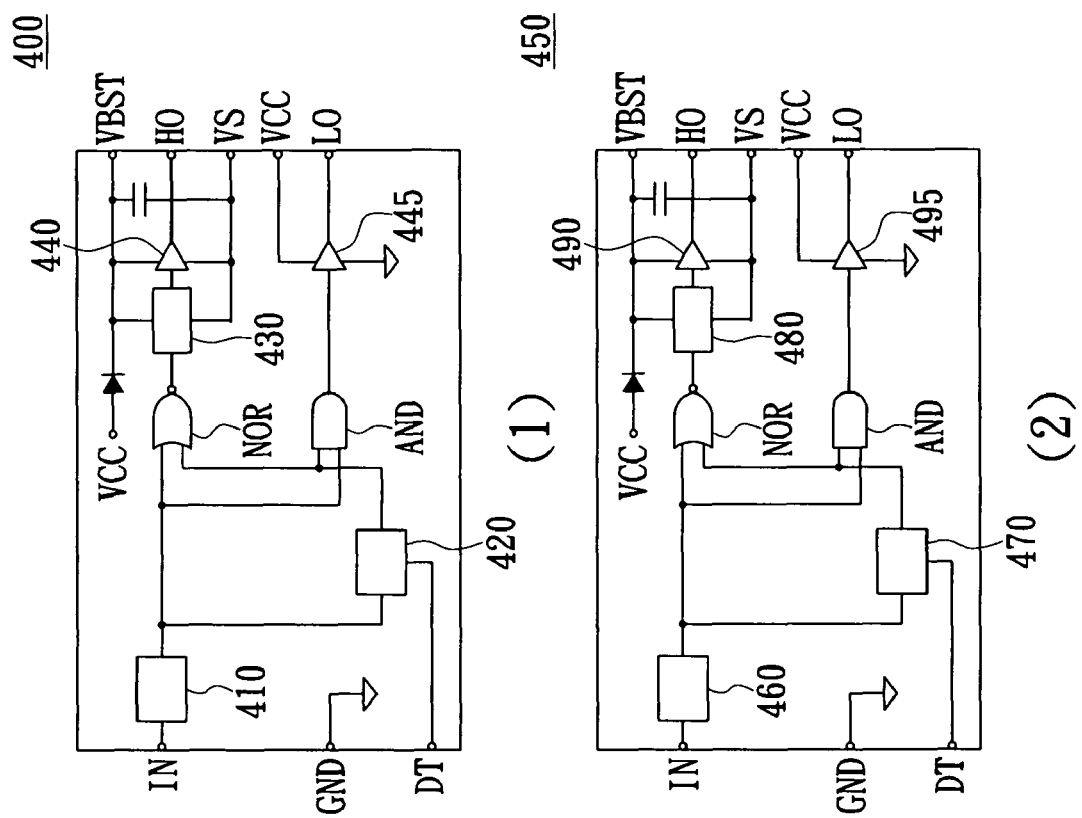
FIG. 7 are block diagrams of the High/Low side driver of the present invention applied to full-bridge based topology.

FIG. 7 are block diagrams of the High/Low side driver of the present invention applied to full-bridge based topology. FIG. 7 (1) shows a left High/Low side driver 400, herein, through an odd pulse selector 410, the input of the left High/Low side driver 400 selects odd pulses to the inputs of logic gates NOR and AND; meanwhile, the odd pulses selected by the odd pulse selector 410 also pass through a delay control circuit 420, generating accordingly a delay signal to the other inputs of the logic gates NOR and AND. The logic gate NOR receives the output signals from the odd pulse selector 410 and the delay control circuit 420 to generate a High side input signal. The High side input signal, through a level shift circuit 430 and then an output driver 440, forms a left High side pulse driving signal having a level different from the High side input signal. On the other hand, the logic gate AND also receives the output signals from the odd pulse selector 410 and the delay control circuit 420 to generate a Low side input signal, and this signal, through an output driver 445, forms a left Low side pulse driving signal. Further referring to FIG. 7 (2), which shows a right High/Low side driver 450, herein, through an even pulse selector 460, the input of the right High/Low side driver 450 selects even pulses to the inputs of logic gates NOR and AND; meanwhile, the even pulses selected by the even pulse selector 460 also pass through a delay control circuit 470, generating accordingly a delay signal to the other inputs of the logic gates NOR and AND. The logic gate NOR receives the output signals from the even pulse selector 460 and the delay control circuit 470 to generate a High side input signal, and this signal, through a level shift circuit 480 and then an output driver 490, forms a right High side pulse driving signal having a level different from the High side input signal. On the other hand, the logic gate AND also receives the output signals from the even pulse selector 460 and the delay control circuit 470 to generate a Low side input signal, and this signal, through an output driver 495, forms a right Low side pulse driving signal.

Figure 8:
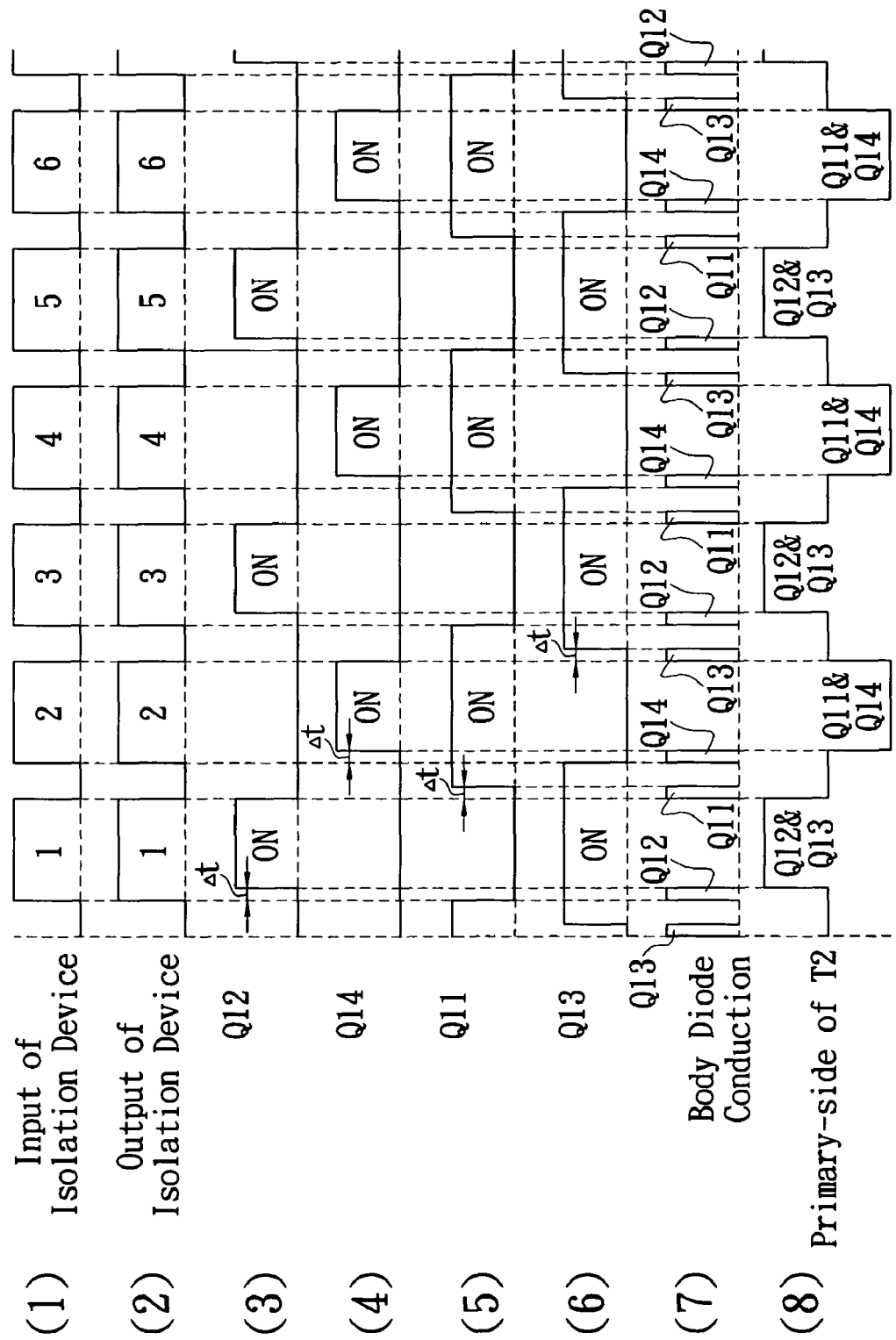
FIG. 8 are action waveform diagrams of the present invention applied to full-bridge based topology.

FIG. 8 are action waveform diagrams of the present invention applied to full-bridge based topology. Referring conjunctively to FIG. 5, the square waveform shown in FIG. 8 (1) is the waveform found on the input of the isolation device, and in FIG. 8 (2) the waveform found on the output of the isolation device. FIG. 8 (3)~(6) respectively illustrate the conducting time of the power switches Q12, Q14, Q11 and Q13, wherein Δt represents the time delay caused by the delay control circuit; next, in FIG. 8 (7), it shows the conducting time of the body diode in the power switch, whose conducting is Q13, Q12, Q11, Q14, Q13, . . . ; and finally, FIG. 8 (8) shows the voltage waveform on the primary-side winding set of the transformer T2. The Δt is usually set to be about 100~300 nanoseconds, controlling an extremely short time period in order to let the current flows through the power switch for most of the time, thus providing better efficiency than the prior art full-bridge based power supply.

Figure 9:
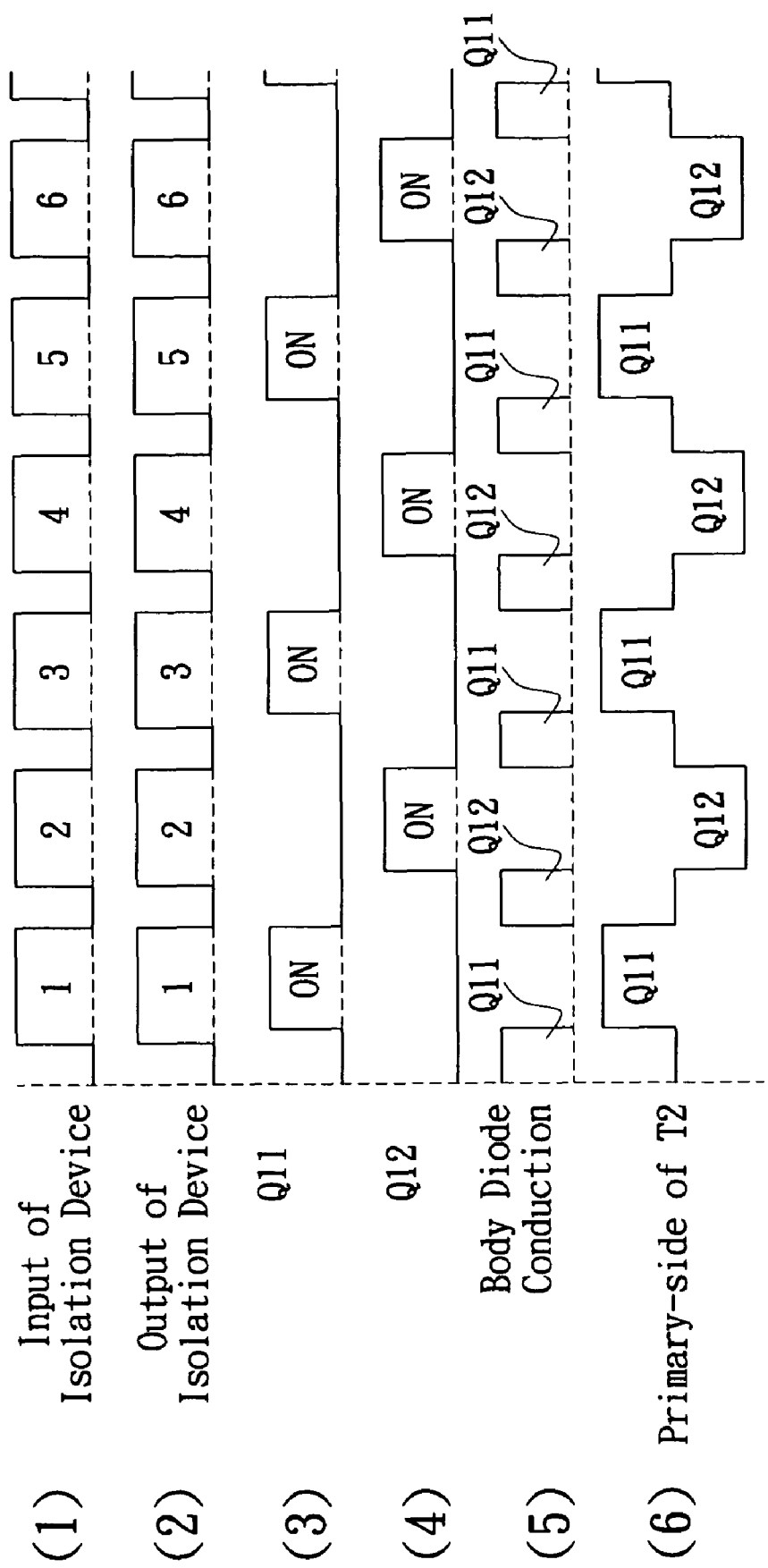
FIG. 9 are action waveform diagrams of the present invention applied to half-bridge based topology.

FIG. 9 are action waveform diagrams of the present invention applied to half-bridge based topology. Referring conjunctively to FIG. 4, the square waveform shown in FIG. 9 (1) is the waveform found on the input of the isolation device, and in FIG. 9 (2) the waveform found on the output of the isolation device; subsequently, FIGS. 9 (3)~(4) respectively illustrate the conducting time of the power switches Q11, Q12, and, next, FIG. 9 (5) shows the conducting time of the body diode in the power switch; finally, FIG. 9 (6) shows the voltage waveform on the primary-side winding set of the transformer T2.

Figure 10:
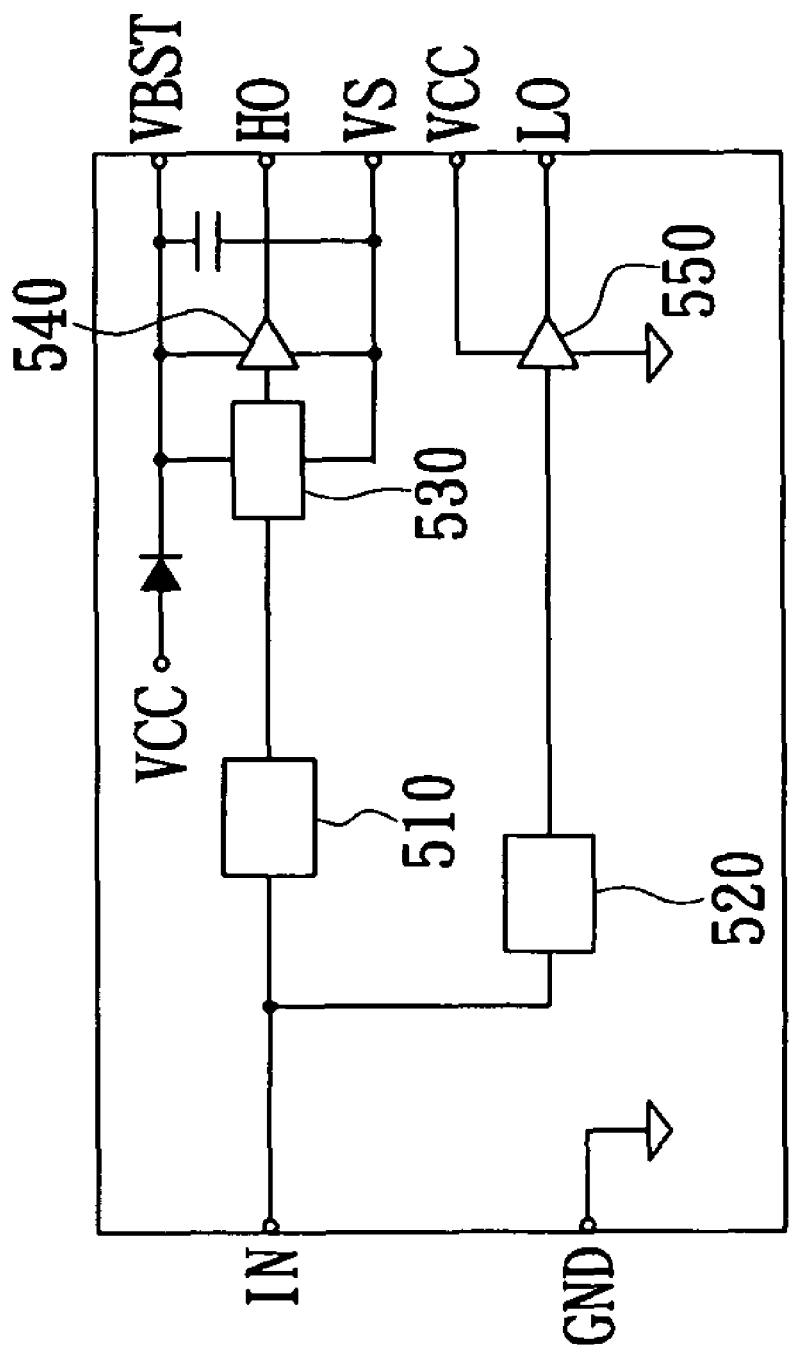
FIG. 10 is a block diagram of the High/Low side driver of the present invention applied to half-bridge based topology.

FIG. 10 is a block diagram of the High/Low side driver of the present invention applied to half-bridge based topology. As shown in FIG. 10, input pulses are selected by an odd pulse selector 510 and an even pulse selector 520 for input signal selection. The odd pulse selector 510 selects the odd pulse as High side input signal, which passes through a level shift circuit 530, thus generating a signal having a voltage level different from the level of the High side input signal, then further through an output driver 540 to generate the High side pulse driving signal. Meanwhile, the even pulse selector 520 selects even pulse as Low side input signal, which passes through an output driver 550 and generates the Low side pulse driving signal.

As described supra, the present invention completely matches the three requirements for patent application: innovation, progression, and industrial application. The present invention has been disclosed by means of the aforementioned preferred embodiments, but persons skilled in the art can appreciate that the disclosed embodiments are merely for illustrating the present invention, and should not be construed as restricting the scope of the present invention thereto. It is noted that all changes, substitutions or modifications made for the disclosed embodiments and equivalent in effect are to be regarded as being encompassed within the scope of the present invention. Therefore, the legally protected scope of the present invention should be delineated by the following claims.

What is claimed is:

1. A primary-side driving control circuit for backlight of Liquid Crystal Display (LCD) panel, comprising:
    a transformer, which has a primary-side and a secondary-side, converting the energy received on the primary-side to output on the secondary-side to drive a light source module;
    a power switch element, which is coupled to an input power source and the primary-side of the transformer, transmitting the power from the input power source to the primary-side of the transformer;
    a Pulse Width Modulation (PWM) controller, which has at least one feedback control terminal and an input signal control terminal, as well as at least one output terminal, wherein the PWM controller generates output signals on the at least one output according to the signals received on the at least one feedback control terminal and the input signal control terminal;
    an isolation device, which has an input terminal and an output terminal, in which the input terminal receives the output signals from the PWM controller, and outputs an isolation signal on the output terminal; and
    a High/Low side driver, which is coupled to the isolation device and the power switch element, controlling the power switch element to transmit the energy of the input power source to the primary-side of the transformer based on the isolation signal;
    wherein the output terminal of the PWM controller is coupled to the input terminal of the isolation device through a diode.

2. The primary-side driving control circuit for backlight of LCD panel according to claim 1, wherein the isolation device is a photo-coupler.

3. The primary-side driving control circuit for backlight of LCD panel according to claim 2, wherein the power switch element comprises two power switches, which, in combination with the transformer, forms a half-bridge based driving device.

4. The primary-side driving control circuit for backlight of LCD panel according to claim 3, further comprising a capacitor coupled to the primary-side of the transformer.

5. The primary-side driving control circuit for backlight of LCD panel according to claim 4, wherein the High/Low side driver has a High side output and a Low side output, respectively, for controlling the switching actions of the two power switches.

6. The primary-side driving control circuit for backlight of LCD panel according to claim 5, wherein the High/Low side driver has a level shift circuit for adjusting the level of driving signal output from the High side output.

7. The primary-side driving control circuit for backlight of LCD panel according to claim 4, wherein the input power source is generated by a power factor correcting circuit, which the power factor correcting circuit adjusts a power factor of AC input and outputs the input power source.

8. The primary-side driving control circuit for backlight of LCD panel according to claim 2, wherein the power switch element comprises four power switches, which, in combination with the transformer, forms a full-bridge based driving device.

9. The primary-side driving control circuit for backlight of LCD panel according to claim 8, wherein the High/Low side driver has two High/Low side driving units, each High/Low side driving unit has a High side output and a Low side output to respectively control the switching actions of these four power switches.

10. The primary-side driving control circuit for backlight of LCD panel according to claim 9, wherein the High/Low side driver has a level shift circuit for adjusting the level of the driving signal from the High side output.

11. The primary-side driving control circuit for backlight of LCD panel according to claim 9, wherein each of the two High/Low side driving units has a pulse selector, one of the pulse selectors selects the odd pulse signal of the isolation signals, and the other pulse selectors selects the even pulse signal of the isolation signals, so as to respectively input the corresponding High/Low side driving unit.

12. The primary-side driving control circuit for backlight of LCD panel according to claim 9, wherein each of the two High/Low side driving units has a delay control circuit used to control the output of the High/Low side driving unit, such that there exists a time interval between output times of the High/Low side outputs.

13. The primary-side driving control circuit for backlight of LCD panel according to claim 8, wherein the input power source is generated by a power factor correcting circuit, which the power factor correcting circuit adjusts a power factor of AC input and outputs the input power source.

14. The primary-side driving control circuit for backlight of LCD panel according to claim 8, wherein the PWM controller has two outputs, and each of these two outputs is respectively coupled to the input of the photo-coupler through a diode.

15. A control circuit for backlight of Liquid Crystal Displayer (LCD) panel, comprising:
    a power factor correcting circuit, which receives an AC power source to generate a DC input power source;
    a power switch element, which is coupled to the DC input power source;
    a transformer, which has a primary-side and a secondary-side, in which the primary-side of the transformer is coupled to the power switch element, so as to convert the energy received from the DC input power source to output on the secondary-side to drive a light source module;
    a Pulse Width Modulation (PWM) controller, which generates output signal according to the condition of the light source module;
    a photo-coupler, which has an input terminal and an output terminal, the input terminal receives the output signal from the PWM controller, and the output terminal sends an isolation signal; and a High/Low side driver, which is coupled to the photo-coupler and the power switch element, controlling the power switch element to transmit the energy of the input power source to the primary-side of the transformer based on the isolation control signal;

wherein the PWM controller has two outputs, and each of these two outputs is respectively coupled to the input of the photo-coupler through a diode.

16. The control circuit for backlight of LCD panel according to claim 15, wherein the High/Low side driver has a level shift circuit for adjusting the level of a portion of output signal.

17. The control circuit for backlight of LCD panel according to claim 16, wherein the High/Low side driving unit has a delay control circuit to control the time interval between the output signals.

18. The control circuit for backlight of LCD panel according to claim 16, wherein the power switch element is a half-bridge based power switch element or a full-bridge based power switch element.

* * * * *